Patented Mar. 23, 1954

2,673,209

UNITED STATES PATENT OFFICE 2,673,209

SUBSTITUTED DERIVATIVES OF BENZO-QUINONE AS BODYING AGENTS FOR OILS

De Walt S. Young and Lee G. Davy, Kingsport, Tenn., assignors to Eastman Kodak Company, Rochester, N. Y., a corporation of New Jersey No Drawing. Application August 8, 1951, Serial No. 240,984

21 Claims. (Cl. 260—407)

This invention relates to the use of benzoquinone derivatives as catalytic agents for the treatment of vegetable oils so as to obtain products of increased viscosity or body which are useful in the protective coating art.

One of the most time consuming operations in the manufacture of paints, varnishes, and other related coating materials has been the preparation of partially polymerized or "bodied" oils of increased viscosity, as compared to the viscosity of the starting material. The viscosity of vegetable oils can, in many instances, be increased to the desired extent by heating such oils to high temperatures under various conditions. However, such heat-bodying processes are subject to several disadvantages as, for example, the following:

(A) Long reaction period,
(B) Darkening in color to an objectionable extent caused by prolonged heating, and
(C) Decomposition of the oil at high temperatures.

The polymerization or bodying of oils can be promoted or accelerated by the presence of many catalytic agents, e. g. metals, salts, halanhydrides, numerous organic compounds, etc. However, many of these agents cause an excessive darkening in the color of oil, thereby rendering the oil of diminished value for many of the purposes for which it may be intended.

U. S. Patent 2,213,935, dated September 3, 1940, discloses the employment of polycyclic condensed ring systems containing nuclear oxo substituents as catalysts in the heat bodying of oils. It is stated that the employment of these catalytic agents in small concentrations brings about the desired polymerization of various oils at an increased speed without color deterioration. However, such polycyclic condensed ring oxo derivatives are relatively expensive as compared with the simpler, non-ring condensed quinone catalysts employed in accordance with our invention. U. S. 2,298,915, dated October 13, 1942, also discloses the employment of organic cyclic compounds containing a condensed ring system in the molecule which are capable of modifying the physical properties of vegetable oils, for example, 2-amino-anthraquinone.

In addition to U. S. 2,298,915, mentioned above, there are at least eight other patents issued to the same inventor, namely Laszlo Auer, all of which relate to the modification or catalyzing of various materials including vegetable oils whereby a product of increased viscosity can be obtained. These patents include 2,213,944, dated September 10, 1940; 2,234,949, dated March 18, 1941; 2,344,666, dated June 10, 1941; 2,298,270, 2,298,271, 2,298,918, 2,298,919 (the latter four patents being dated October 13, 1942); and 2,322,106, dated June 15, 1943. In addition to Auer's Patent No. 2,234,949, which relates to the employment of aromatic amines, a patent to W. C. Arsem, No. 1,760,535, dated May 27, 1930, makes a similar disclosure.

None of the prior art mentioned herein-above discloses the employment of derivatives of benzoquinone for the bodying of vegetable oils. Furthermore, none of this art discloses the employment of more than a very limited number of oxo derivatives of particular types as bodying agents. Examples of the oxo derivatives disclosed include p,p' diamino-diphenylbenzophenone, 1,4-diaminoanthraquinone, urea derivatives, such as diaminodiaryl urea compounds, and similar compounds, none of which are oxo-substituted alicyclic derivatives such as derivatives of benzoquinone, which, from the point of view of their alicyclic oxo-substituted structure, could be termed 2,5-cyclohexadiene-1,4-dione derivatives.

We have now found that derivatives of benzoquinone having the following formula:

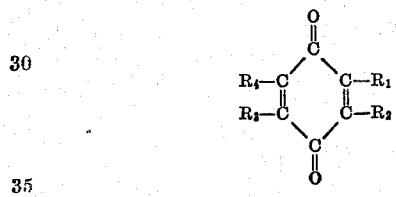

wherein $R_1$ represents a substituent selected from those consisting of alkyl radicals, substituted alkyl radicals, alkoxy radicals, aryl radicals, substituted aryl radicals, aryloxy radicals, alkylamino radicals, arylamino radicals, an amino radical, a chlorine atom, a bromine atom and a nitro radical, and $R_2$, $R_3$ and $R_4$ each represents a hydrogen atom or any substituent selected from those which $R_1$ can represent. The substituents on the alkyl and aryl radicals include an alkyl radical, an aryl radical, a nitro radical, an amino radical, a halogen atom, etc. The nitrogen atom of the alkylamino and arylamino radicals can be tertiary, as well as secondary, e. g. dialkylamino, diarylamino and arylalkylamino.

Examples of the benzoquinone derivatives which fall within the scope of the above-defined formula and which can be employed in accordance with our invention include, p-nitrophenylquinone, 2,5-dioctylquinone, phenylquinone, 2,5- di-n-butylaminoquinone, 2,5-dianilinoquinone, phenyltrichloroquinone, 2,5-di-tert-butylquinone, 2,5-dimethoxyquinone, etc. It is believed that the prior art clearly indicates the broad nature of the substituents which can be employed, for example, a study of the patents referred to above clearly indicates that many other substituents than those set forth under the above defined formula would no doubt result in substituted quinone derivatives having worthwhile bodying properties.

It is an object of our invention to provide a new type of catalytic bodying agents consisting of the substituted benzoquinone derivatives. It is a further object of our invention to provide a process for the bodying of vegetable oils employing substituted benzoquinone derivatives. Another object of our invention is to provide a process for producing bodied oils in an economically advantageous manner. A further object is to provide a method for producing highly satisfactory coating materials, such as paints and varnishes wherein the oil constituents of these coating materials are bodied by the employment of derivatives of benzoquinone. Still further objects will become apparent hereinafter.

Examples of the oils which can be bodied in accordance with this invention include vegetable oil, etc. In addition to the vegetable oils, esters of soya bean oil, poppyseed oil, sunflower oil, cottonseed oil, corn oil, olive oil, castor oil, hempseed oil, etc. In addition to the vegetable oils, esters of the fatty acids which are present in any of these oils, other than the natural glycerides can also be employed. In the preparation of coating materials, vegetable oils are generally employed. However, any of the oils subject to bodying processes can be employed in accordance with the process of this invention.

The vegetable oils can be classified as follows:

Drying oils:
  Linseed oil
  Tung oil
  Perilla oil
Semi-drying oils:
  Poppyseed oil
  Rapeseed oil
  Sunflower oil
  Soya bean oil
  Walnut oil
  Pineseed oil
Non-drying oils:
  Olive oil
  Corn oil
  Cottonseed oil
  Cocoanut oil In accordance with the invention, the oils referred to may be treated individually or they may be treated in mixtures containing more than one of these oils. Such mixtures may also contain other materials such as plasticizers, synthetic resins, natural resins, fatty oils of synthetic origin, etc.

The oils can be bodied in accordance with this invention by introducing the substituted benzoquinone derivatives into the unbodied oil and then heating to an elevated temperature or the oil can be first heated and the benzoquinone derivative added to the hot oil. If desired, the oil can be partially bodied in an elevated temperature prior to the introduction of the substituted benzoquinone derivative. Advantageously the oil which is to be bodied is heated with the subsequent addition of benzoquinone derivative. Auxiliary agents can also be employed if desired. Moreover the oil to be bodied can also be in admixture with other materials during the bodying process. Such additional materials can include plasticizers and other modifying ingredients.

Various proportions of the substituted benzoquinone derivatives can be employed in effecting the bodying of the oil. Generally speaking a quantity of this catalyst on the order of 1% can be employed. However, depending upon the degree of bodying desired and the speed with which the bodying is to be accomplished, the concentration of the substituted benzoquinone derivative can be varied from a small fraction of 1% up to 10% or more by weight of the oil being bodied. Advantageously from 0.1% to 5% of the benzoquinone derivative is employed. Two or more of such derivatives can also be advantageously employed together in which case the total concentration of such catalysts is advantageously from about 0.1% to about 5%.

The temperature at which the bodying process is conducted is also dependent upon similar factors as the concentration of the substituted benzoquinone derivatives being employed. Higher temperatures produce more rapid bodying but as the temperature is increased some discoloration may occur. Temperatures which can be employed also depend upon the nature of the oil being bodied inasmuch as some oils are more susceptible to decomposition than others. Advantageously a temperature of from about 500° F. to about 650° F. is generally satisfactory. However, higher or lower temperatures can also be employed, depending upon the conditions as indicated. Most advantageously a temperature from about 535° F. to about 625° F. is employed in accordance with modern practice in the bodying of the oils.

Inasmuch as the primary feature of this invention resides in the provision of a new class of oil bodying agents, namely the substituted benzoquinone derivatives, it is not believed necessary to indulge in a lengthy description of the various modifications of those procedures which can be employed in the bodying of oils employing such substituted benzoquinone derivatives. The prior art discussed above, together with the other prior art, gives numerous examples and describes various methods of varying the procedures which can be employed.

The following examples will serve to further illustrate the invention. In these examples, linseed oil was selected because of its widespread use as a typical oil of the class described above.

Twenty-one separate examples are set forth below. In each example a beaker containing 50 grams of raw linseed oil was employed. The 50-gram samples of oil employed for a given benzoquinone derivative were drawn from a larger quantity of raw linseed oil which was of uniform quality so that the results could be compared with a control sample of 50-grams of the same raw oil wherein no benzoquinone derivative was present. The control data tabulated below is in addition to the 21 examples of bodied oils containing a catalyst. The beakers containing 50 grams of raw linseed oil were heated to 550° F., and the benzoquinone derivative was added so as to result in a concentration of 0.5% in one series of examples, 1.0% in another series of examples, and 1.5% in a third series of examples, for each of the benzoquinone derivatives listed below. Concentrations are based on the weight of the raw linseed oil. Heating was continued for two hours with occasional stirring, maintaining a temperature of approximately 550° F. After this, the bodied oil was cooled to 250 C. in each instance and the viscosity was determined using Gardner-Holdt viscosity tubes as a standard. In order to avoid repetition in stating the procedure employed in each of the 21 examples employing substituted benzoquinone derivatives, the following tabulation is presented, wherein the viscosities are reported to the nearest letter on the Gardner-Holdt (G. H.) viscosity scale and also in poises (P.).

*Results obtained in the heat bodying of linseed oil in the presence of benzoquinone derivatives*

| Concentration | 0% | | 0.5% | | 1.0% | | 1.5% | |
|---|---|---|---|---|---|---|---|---|
| | G. H. | P. | G. H. | P. | G. H. | P. | G. H. | P. |
| Bodying Agents: | | | | | | | | |
| p-nitrophenylquinone | O | 3.7 | U | 6.27 | V | 8.84 | W | 10.7 |
| 2,5-dioctylquinone | O | 3.7 | K | 2.75 | T | 5.50 | | |
| phenylquinone | O | 3.7 | K | 2.75 | O | 3.7 | T | 5.5 |
| 2,5-di-n-butylaminoquinone | K | 2.75 | S | 5.00 | V | 8.84 | Y | 17.6 |
| 2,5-di-anilinoquinone | K | 2.75 | U | 6.27 | W | 10.7 | Z | 22.7 |
| phenyltrichloroquinone | K | 2.75 | V | 8.84 | U | 6.27 | V | 8.84 |
| 2,5-di-tert-butylquinone | K | 2.75 | S | 5.00 | | | | |
| 2,5-dimethoxyquinone | K | 2.75 | V | 8.84 | X | 12.9 | Z | 27 |

The above 21 examples resulted in the preparation of bodied oils of various degrees of clarity. The benzoquinone derivatives wherein the substituent group or groups was alkyl, alkoxy, or an unsubstituted aryl group, resulted in the production of clear bodied oils. The benzoquinone derivatives which contained a substituent group containing the nitro, amino, and chloro substituents resulted in bodied oils which were satisfactory for use in coating materials; however, these bodied oils were darker in nature than the other bodied oils. Thus, the best results can generally be obtained employing benzoquinone derivatives which contain substituents which are hydrocarbon or alkoxy radicals instead of radicals of acids or amine radicals.

It is clearly evident that other oils can be employed advantageously in accordance with the above described process wherein linseed oil was employed, and that other temperatures and concentrations as well as periods of heating can advantageously be employed to produce satisfactory products. Thus, sunflower oil can be heated at 575° F. employing 4% of 2,5-diethoxyquinone as the catalyst; soy bean oil can be heated at 625° F. employing p-tolylquinone at a concentration of 5%; perilla oil can be heated at a temperature of 535° F. employing 2,5-diisopropylquinone at a concentration of 3%. The bodied oils so obtained can be employed in the preparation of coating materials.

What we claim as our invention and desire to secure by Letters Patent of the United States is:

1. A process for preparing bodied vegetable oils which comprises heating a vegetable oil at an elevated temperature in the presence of a substituted benzoquinone derivative.

2. A process for preparing bodied vegetable oils which comprises heating a vegetable oil to a temperature below that at which substantial decomposition takes place, mixing therewith a catalytic amount of a substituted benzoquinone derivative, and continuing the heating until the oil becomes bodied.

3. A process for preparing bodied vegetable oils which comprises heating a mixture comprising a vegetable oil and a catalytic amount of a substituted benzoquinone derivative to a temperature below that at which substantial decomposition takes place and continuing the heating until the oil becomes bodied.

4. A process for bodying vegetable oils which comprises heating a vegetable oil in the presence of a catalytic amount of a substituted benzoquinone derivative at a temperature of from about 500° F. to about 650° F.

5. A process as defined in claim 4 wherein substituted benzoquinone derivative is present in an amount of from about 0.1% to about 10% by weight of the vegetable oil.

6. A process as defined in claim 5 wherein the temperature range is from about 535° F. to about 625° F. and the benzoquinone derivative is present to the extent of from about 0.1% to about 5%.

7. A process for bodying vegetable oils which comprises heating a vegetable oil in the presence of from about 0.1% to about 10% by weight of the oil of a substituted benzoquinone derivative wherein the substituent is a hydrocarbon radical.

8. A process as defined in claim 7 wherein the substituted benzoquinone derivative is 2,5-dioctylquinone.

9. A process as defined in claim 7 wherein the substituted benzoquinone derivative is phenylquinone.

10. A process as defined in claim 7 wherein the substituted benzoquinone derivative is 2,5-di-tert-butylquinone.

11. A process as defined in claim 7 wherein the substituted benzoquinone derivative is 2,5-dimethoxyquinone.

12. A process for bodying vegetable oils which comprises heating a vegetable oil to a temperature of from about 500° F. to about 650° F. in the presence of from about 0.1% to about 10% by weight of the oil of a substituted benzoquinone derivative having the formula:

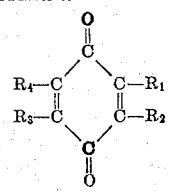

wherein $R_1$ represents a substituent selected from those consisting of alkyl radicals, $R_5$ substituted alkyl radicals, alkoxy radicals, aryl radicals, $R_5$ substituted aryl radicals, aryloxy radicals, alkylamino radicals, arylamino radicals, an amino radical, a chlorine atom, a bromine atom and a nitro radical, wherein $R_5$ represents a group selected from those consisting of alkyl, aryl, nitro and amino radicals and chlorine and bromine atoms, and $R_2$, $R_3$ and $R_4$ each represents a hydrogen atom or any substituent selected from those which $R_1$ can represent.

13. A process as defined in claim 11 wherein the temperature is from about 535° F. to about 625° F. and the concentration of the substituted benzoquinone derivative is from about 0.1% to about 5% based on the weight of the oil.

14. A process as defined in claim 13 wherein the substituted benzoquinone derivative is 2,5-dioctylquinone.

15. A process as defined in claim 13 wherein the substituted benzoquinone derivative is phenylquinone.

16. A process as defined in claim 13 wherein the substituted benzoquinone derivative is 2,5-di-tert-butylquinone.

17. A process as defined in claim 13 wherein the substituted benzoquinone derivative is 2,5-dimethoxyquinone.

18. A process as defined in claim 13 wherein the oil is linseed oil and the substituted benzoquinone derivative is 2,5-dioctylquinone.

19. A process as defined in claim 13 wherein the oil is linseed oil and the substituted benzoquinone derivative is phenylquinone.

20. A process as defined in claim 13 wherein the oil is linseed oil and the substituted benzoquinone derivative is 2,5-di-tert-butylquinone.

21. A process as defined in claim 13 wherein the oil is linseed oil and the substituted benzoquinone derivative is 2,5-dimethoxyquinone.

DE WALT S. YOUNG.
LEE G. DAVY.

References Cited in the file of this patent

UNITED STATES PATENTS

| Number | Name | Date |
|---|---|---|
| 2,077,887 | Kranzlein et al. | Apr. 20, 1937 |
| 2,086,337 | Schirm | July 6, 1937 |
| 2,207,686 | Schwarcman | July 9, 1940 |
| 2,335,521 | Lasher | Nov. 30, 1943 |